United States Patent [19]
Shimizu

[11] Patent Number: 5,684,632
[45] Date of Patent: Nov. 4, 1997

[54] VARIABLE WAVELENGTH OPTICAL FILTER

[75] Inventor: Haruhito Shimizu, Tokyo, Japan

[73] Assignee: NEC Corporation, Tokyo, Japan

[21] Appl. No.: 341,201

[22] Filed: Dec. 5, 1994

[30] Foreign Application Priority Data

Dec. 28, 1993 [JP] Japan ................... 5-338604

[51] Int. Cl.$^6$ .................................................. G02B 27/00
[52] U.S. Cl. ................... 359/578; 359/578; 250/227.18
[58] Field of Search .................... 359/498, 577, 359/578, 579, 570, 8; 356/352, 332, 416, 419; 250/227.18

[56] References Cited

U.S. PATENT DOCUMENTS

| | | | |
|---|---|---|---|
| 2,555,387 | 6/1951 | Zobel | 359/578 |
| 2,687,670 | 8/1954 | Locquin | 359/498 |
| 2,742,818 | 4/1956 | Horlbut, Jr. | 359/498 |
| 3,588,245 | 6/1971 | Herriott et al. | 359/578 |
| 3,622,790 | 11/1971 | Zavodny | 359/579 |
| 3,740,144 | 6/1973 | Walker | 359/578 |
| 3,934,210 | 1/1976 | Yarborough et al. | 359/498 |
| 4,466,699 | 8/1984 | Droessler et al. | 359/578 |
| 4,804,884 | 2/1989 | Vriens et al. | 359/618 |
| 4,957,371 | 9/1990 | Pellicori et al. | 359/615 |
| 4,988,203 | 1/1991 | Vriens et al. | 356/419 |
| 5,214,494 | 5/1993 | Inaba et al. | 356/419 |
| 5,287,214 | 2/1994 | Robertson et al. | 359/578 |

FOREIGN PATENT DOCUMENTS

| | | | |
|---|---|---|---|
| 61-183616 | 8/1986 | Japan | 359/578 |
| 3-197845 | 8/1991 | Japan | 359/578 |
| 404062506 | 2/1992 | Japan | 359/615 |

OTHER PUBLICATIONS

"A Newly Developed Adaptive Wavelength Tunable Filter for Wavelength Selective Optical Communication Systems", the IEDCE of Japan, Autumn Convention 1993, Paper No. B-904. No month.

Primary Examiner—Paul M. Dzierzynski
Assistant Examiner—John Juba, Jr.
Attorney, Agent, or Firm—Sughrue, Mion, Zinn, Macpeak & Seas, PLLC

[57] ABSTRACT

In a variable wavelength optical filter, a glass plate has a curved surface on one or both sides thereof, and a dielectric multi-layer thin film formed on the curved surface. Light from the outside of the filter is transmitted through the film. The glass plate is movable perpendicularly to an optical axis by being driven by a piezoelectric actuator accommodated in a housing. By moving the glass plate, it is possible to control the angle of the film relative to the incident light and, therefore, the pass wavelength. The actuator positions the glass plate with accuracy, promoting extremely accurate wavelength control. The glass plate may be provided with a convexity on one side and a concavity on the other side which is complementary in configuration to the convexity. This reduces the wavelength dependency of the insertion loss by maintaining the optical axis of input light and that of output light in coincidence.

27 Claims, 2 Drawing Sheets

VARIABLE WAVELENGTH OPTICAL FILTER

BACKGROUND OF THE INVENTION

The present invention relates to a variable wavelength optical filter and more particularly, to a variable wavelength optical filter using an interference film filter and small size, light weight, accurately controllable in pass wavelength, and desirable in response and reliability.

A variable wavelength optical filter is applicable to, for example, a wavelength division multiplex apparatus for selecting light of desired wavelength. One of conventional filters of this kind uses an interference film filter and changes the pass wavelength of light on the basis of an incidence angle to the interference film. The filter for transmission applications has to be capable of performing wavelength selection electrically. Specifically, to multiplex by wavelength division multiplexing signals which are different in wavelength by only several nanometers, it is necessary to apply an electric signal to the filter such that each signal light is accurately controlled to a desired wavelength.

To better understand the present invention, a brief reference will be made to a conventional variable wavelength optical filter shown in FIG. 1. The optical filter shown in the figure is of the type disclosed in, for example, "miniature Adaptive Variable Wavelength Optical Filter", the Institute of Electronic Data Communication Engineers of Japan, Autumn Convention, Paper No. B-904. As shown, the optical filter 21 has an interference thin film filter, a collimator 22 for collimating light to be incident to the interference filter, a piezoelectric actuator 23 for rotating the interference filter, and a rollerway 24. As the piezoelectric actuator 23 moves linearly, the linear movement is transformed into a rotary motion by the rollerway. As a result, the interference filter 21 is rotated to change the incidence angle of light to the filter and, therefore, the pass wavelength.

The conventional optical filter 25 described above is small size and light weight since a drive source for rotating the interference filter 21 is implemented by the piezoelectric actuator 23. However, it has some issues yet to be solved, as follows. To transform the linear motion into the rotary motion, the optical filter 25 uses a drive transmission mechanism. Since the drive transmission mechanism involves play and displacement without exception, it is difficult to control the rotation angle of the interference filter 21, i.e., the pass wavelength with accuracy. Moreover, the optical filter 25 lacks reliability and response high enough to withstand practical use.

SUMMARY OF THE INVENTION

It is an object of the present invention to provide a variable wavelength optical filter which has a small size, consumes a minimum of power, and sets up desired wavelength with accuracy.

A variable wavelength optical filter of the present invention has an optically transparent plate having a first and a second surface facing each other. At least one of the first and second surfaces includes a first curved surface in part thereof which transmits light. An interference film filter is formed on the curved surface. Light incident from a light input section is transmitted through the interference film filter and then output to the outside via a light output section. A mechanism is provided for moving, in response to an electric signal fed from the outside, the plate perpendicular to the optical axis of the light. This mechanism may be implemented as a piezoelectric filter capable of effecting accurate positioning. When the plate is moved perpendicularly to the optical axis, the incidence angle of light to the interference film filter changes. Hence, it is possible to control the pass wavelength with accuracy.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
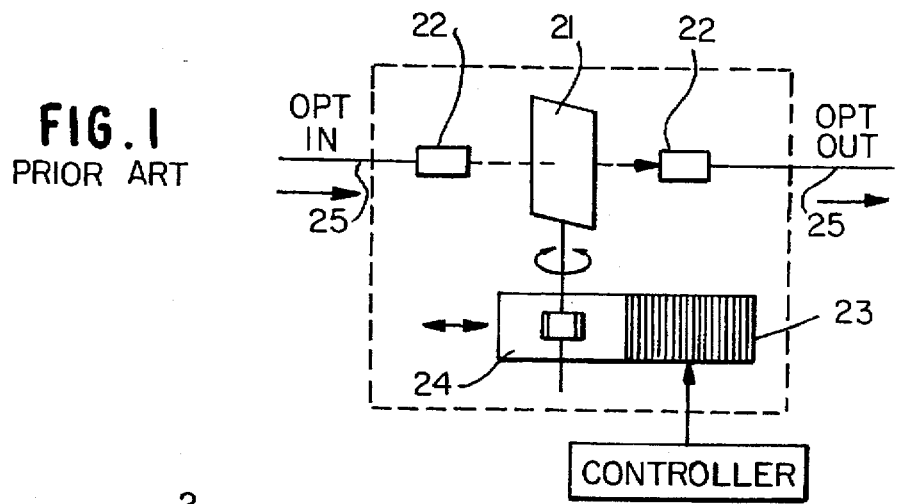
FIG. 1 shows a conventional variable wavelength optical filter.
Figure 2:
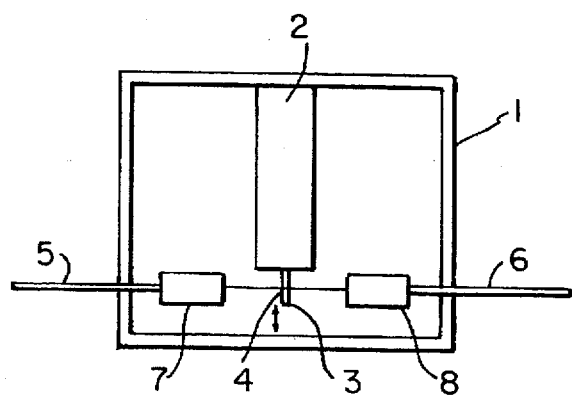
FIG. 2 shows a variable wavelength optical filter embodying the present invention.
Figure 3:
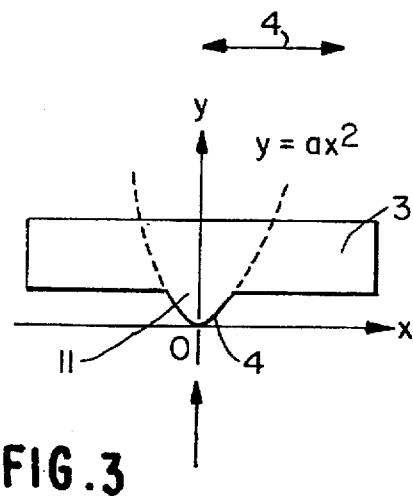
FIG. 3 is a front view of a glass plate included in the embodiment and provided with a dielectric multi-layer thin film.

Referring to FIG. 2, a variable wavelength optical filter embodying the present invention is shown. As shown, the optical filter has a housing 1 and a piezoelectric actuator 2. The actuator 2 is affixed to the housing 1 at one end thereof perpendicular to a direction in which the actuator 2 is extendible. A glass plate 3 is affixed to the other end of the actuator 2 remote from the housing 1. As shown in FIG. 3, the glass plate 3 is formed with a salient surface 11 on one major surface thereof by vacuum deposition. The salient surface 11 protrudes in the direction in which the actuator 2 is extendible, i.e., in which the glass plate 3 is movable. Specifically, in the illustrative embodiment, the glass plate 3 is formed with the salient surface 11 by molding, and then a dielectric multi-layer thin film filter 4, consisting of $SiO_2$ and $TiO_2$, is formed on the surface 11 by vacuum deposition. As shown in FIG. 2, an input optical fiber 5 and an output optical fiber 6 are affixed to the housing 1. Lenses 7 and 8 are provided on the ends of the optical fibers 5 and 6, respectively.

Figure 4:
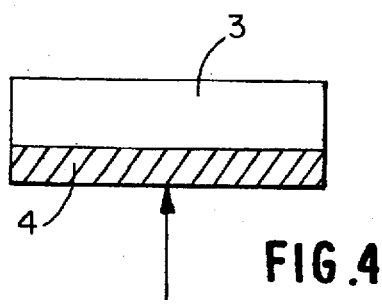
FIG. 4 is a side elevation of the glass platen.

A reference will be made to FIG. 4, as well as to FIG. 3, for describing the glass plate 3 specifically. Assume that the glass plate 3 is movable in a direction x while a light beam is incident to the plate 3 in a direction y, and that the center of the salient surface 11 is the origin of the x-y coordinates. Then, the salient surface 11 is expressed as:

$$y = ax^2 \qquad Eq.\ (1)$$

where a represents $9.1 \times 10^{-3}$ [1/μm]. Of course, the part of the glass plate 3 forming the salient surface 11 should be greater than the diameter of the collimated light.

In operation, light incident to the input optical fiber 5 is collimated by the lens 7 and then incident to the dielectric multi-layer thin film filter, or interference filter 4. The filter 4 transmits only the components of the incident light coincident with the pass wavelength of the filter 4. The components transmitted through the filter 4 is focused by the lens 8 onto the output optical fiber 6. When the piezoelectric actuator 2 is extended or retracted by a voltage, it moves the glass plate 3 perpendicularly to the optical axis. As a result, the angle of the filter 4 relative to the optical axis, i.e., the incidence angle of the light beam to the filter 4 changes, thereby changing the pass wavelength, Assuming that the angle between the optical axis and the normal to the filter 4 is the incidence angle $\theta$ of light, the pass wavelength $\gamma_0$ when the incidence angle is $\theta$ is produced by:

$$\lambda_0 = \lambda_0 \sqrt{1 - b \cdot \sin^2\theta} \qquad \text{Eq. (2)}$$

where $\gamma_0$ is a pass length when $\theta$ is 0°, and b is a constant particular to the filter 4 and is 0.315. Such a change in pass length due to a change in incidence angle is known in the art and taught in, for example, Japanese Patent Application No. 60-161720. When the light beam is incident in a direction x shown in FIG. 3, the incidence angle $\theta$ to the filter 4 is expressed as:

$$\theta = \tan^{-1}(2ax) \qquad \text{Eq. (3)}$$

Therefore, a pass wavelength $\gamma_x$ when the light beam is incident in the direction x is determined by:

$$\lambda_x = \lambda_0 \sqrt{1 - b \cdot \sin^2\{\tan^{-1}(2ax)\}} \qquad \text{Eq. (4)}$$

where $\gamma_0$ is a pass wavelength when x is 0 and has the same value as produced by the Eq. (2).

In the above Eq. (4), when $\gamma_0$ and x are respectively 1550 nm and 20 µm, the pass wavelength is [1521] nm. Hence, the wavelength is variable over 29 nm.

Figure 5:
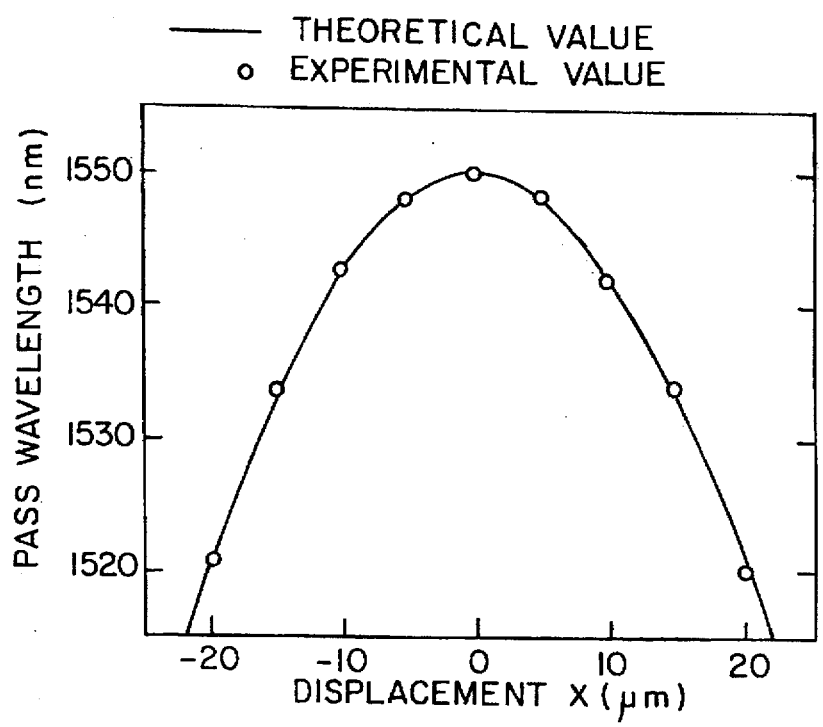
FIG. 5 is a graph showing theoretical and experimental values of pass wavelength versus the displacement of the glass plate particular to the embodiment.

FIG. 5 is a graph showing a relation between the displacement of the glass plate 3 in the direction x and the theoretical and experimental values of the pass wavelength 65 $_x$. As the graph indicates, the pass wavelength $\gamma_x$ sequentially decreases from the center wavelength of 1550 nm as the displacement x increases. With the embodiment, it is possible to control the wavelength over about 30 nm when the displacement x is 20 µm. The experimental values are well coincident with the theoretical values, proving accurate control available with the embodiment.

As stated above, in the illustrative embodiment, the piezoelectric actuator 2 is selectively extended or retracted to move the glass plate 3 having the dielectric film or filter 4 thereon. This makes it possible to change the pass wavelength of light in a continuous way. Since the wavelength selection is realized by the linear movement of the actuator 2 without the intermediary of a drive transmission mechanism, there can be implemented an optical filter which is small size, light weight, controllable in pass wavelength with accuracy, and desirable in responmse and reliability.

Figure 6:
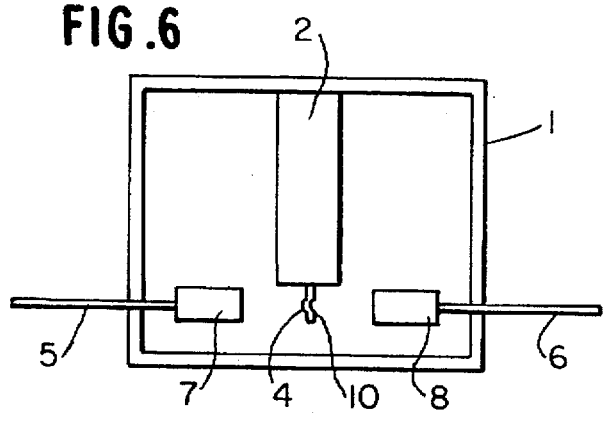
FIG. 6 shows an alternative embodiment of the present invention.

FIG. 6 shows an alternative embodiment of the present invention. This embodiment is essentially similar to the previous embodiment except for the configuration of the other major surface of the glass plate 10 where the dielectric film 4 is absent.

Figure 7:
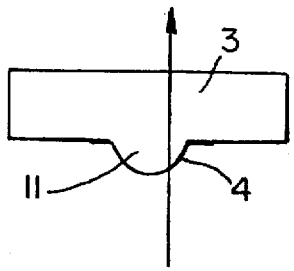
FIGS. 7 and 8 are front views each showing a specific configuration of the glass plate in accordance with the present invention.
Figure 8:
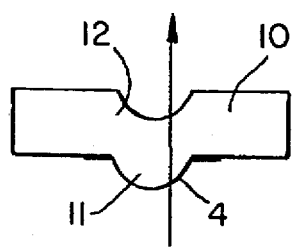

FIGS. 7 and 8 each shows a specific configuration of the glass plate 3 and 10, respectively. In FIG. 7, the surface of the glass plate 3 opposite to the dielectric film 4 is formed flat. In contrast, in FIG. 8, the glass plate 10 has the surface thereof opposite to the dielectric film 4 implemented as a concave surface 12 complementary in shape to the salient surface 11. In the configuration shown in FIG. 7, the light beam incident to the glass plate 3 is steered due to refraction while being transmitted therethrough. Since the direction of refraction depends on the position where the beam is incidence, the coupling efficiency to the output optical fiber 6 changes. Hence, the optical filter shown in FIG. 2 has an insertion loss dependent on the pass wavelength. In FIG. 8, the concave surface 12 of the glass plate 10 is parallel to the salient surface 11, i.e., dielectric film 4. In this configuration, the light beam input to the glass plate 10 is output in the same direction; the insertion loss is sparingly dependent on the pass wavelength.

Figure 9:
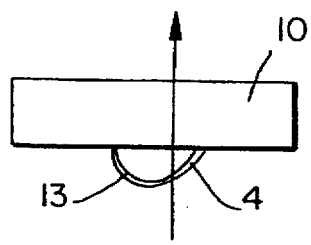
FIG. 9 is a front view of another specific configuration of the glass plate.

It is to be noted that the glass plate 3 or 10 may be provided with any suitable curvature other than one represented by the Eq. (1). The curvature may be either convex or concave. Further, the glass plate 3 may even be replaced with a dielectric plate or a plastic plate so long as it is optically transparent. The wavelength changing function of the present invention is similarly achievable with a semicylindrical salient surface 13 shown in FIG. 9. The semicylindrical surface 13 may be implemented by a semicylindrical rod produced by grinding a cylindrical rod and then adhered to the glass plate 10.

In summary, in accordance with the present invention, a variable wavelength optical filter is implemented as an interference filter provided on a curved glass plate. Hence, wavelength selection is directly effected by the linear movement of a piezoelectric actuator without the intermediary of a drive transmission mechanism. It follows that the optical filter is small size, light weight, controllable in pass wavelength with accuracy, and desirable in response and reliability.

Various modifications will become possible for those skilled in the art after receiving the teachings of the present disclosure without departing from the scope thereof.

What is claimed is:

1. A variable wavelength optical filter comprising:

an optically transparent plate having a first and a second surface facing each other, said first surface having a first curved surface in part thereof;

wavelength selecting means formed on said first curved surface for transmitting light lying in a particular wavelength band;

a light input section for inputting light propagated from a first outside area to a part of said first curved surface;

a light output section for outputting the light transmitted through said wavelength selecting means to a second outside area, said second outside area comprising an optical fiber, and means for moving said plate perpendicularly to an optical axis of the light propagated from the first outside area and for changing the input angle to said curved surface.

2. A filter as claimed in claim 1, wherein said wavelength selecting means comprises an interference filter.

3. A filter as claimed in claim 2, wherein said interference filter comprises a dielectric multi-layer thin film made of $TiO_2$ and $SiO_2$.

4. A filter as claimed in claim 2, wherein said second surface of said plate is flat.

5. A filter as claimed in claim 4, wherein said first curved surface is configured such that a section in a plane containing a direction of movement of said plate and an optical axis of the light from the first outside area is parabolic.

6. A filter as claimed in claim 5, wherein said second surface is concave.

7. A filter as claimed in claim 4, wherein said first curved surface is configured such that a section in a plane containing a direction of movement of said plate and an optical axis of the light from the first outside area is semicircular.

8. A filter as claimed in claim 2, wherein said first curved surface is convex.

9. A filter as claimed in claim 8, wherein said second surface comprises a concave surface complementary to said first curved surface such that the curvatures of said first and second curved surfaces are aligned along an axis extending through the centers of both curved surfaces.

10. A filter as claimed in claim 8, wherein said first curved surface is configured such that a section in a plane containing a direction of movement of said plate and an optical axis of the light from the first outside area is parabolic.

11. A filter as claimed in claim 10, wherein said second surface comprises a concave surface complementary to said first curved surface such that the curvatures of said first and second curved surfaces are aligned along an axis extending through the centers of the curved surfaces.

12. A filter as claimed in claim 8, wherein said first curved surface is configured such that a section in a plane containing a direction of movement of said plate and an optical axis of the light from the first outside area is semicircular.

13. A filter as claimed in claim 2, wherein said second surface is concave.

14. A filter as claimed in claim 1, wherein said means for moving said plate comprises a piezoelectric actuator.

15. A variable wavelength optical filter comprising:

an optically transparent plate having a first and a second surface facing each other, said first surface having a first curved surface in part thereof, wavelength selecting means formed on said first curved surface and transparent for light lying in a particular wavelength band;

a light input section for inputting light propagated from a first outside area to a part of said first curved surface;

a light output section for outputting the light transmitted through said wavelength selecting means to a second outside area; and means for moving said plate perpendicularly to an optical axis of the light propagated from the first outside area and for changing the input angle to said curved surface, saint means for moving comprising a piezoelectric actuator.

16. A filter as claimed in claim 15, wherein said wavelength selecting means comprises an interference filter.

17. A filter as claimed in claim 16, wherein said interference filter comprises a dielectric multi-layer thin film made of $TiO_2$ and $SiO_2$.

18. A filter as claimed in claim 16, wherein said second surface of said plate is flat.

19. A filter as claimed in claim 18, wherein said first curved surface is configured such that a section in a plane containing a direction of movement of said plate and an optical axis of the light from the first outside area is parabolic.

20. A filter as claimed in claim 19, wherein said second surface is concave.

21. A filter as claimed in claim 18, wherein said first curved surface is configured such that a section in a plane containing a direction of movement of said plate and an optical axis from of the light from the first outside area is semicircular.

22. A filter as claimed in claim 16, wherein said first curved surface is convex.

23. A filter as claimed in claim 22, wherein said second surface comprises a concave surface complementary to said first curved surface such that the curvatures of said first and second curved surfaces are aligned along an axis extending through the centers of both curved surfaces.

24. A filter as claimed in claim 22, wherein said first curved surface is configured such that a section in a plane containing a direction of movement of said plate and an optical axis of the light from the first outside area is parabolic.

25. A filter as claimed in claim 24, wherein said second surface comprises a concave surface complementary to said first curved surface such that the curvatures of said first and second curved surfaces are aligned along an axis extending through the centers of the curved surfaces.

26. A filter as claimed in claim 22, wherein said first craved surface is configured such that a section in a plane containing a direction of movement of said plate and an optical axis from of the light from the first outside area is semicircular.

27. A filter as claimed in claim 16, wherein said second surface is concave.

\* \* \* \* \*

UNITED STATES PATENT AND TRADEMARK OFFICE
CERTIFICATE OF CORRECTION

PATENT NO. : 5,684,632
DATED : November 4, 1997
INVENTOR(S) : Haruhito Shimizu

It is certified that error appears in the above-indentified patent and that said Letters Patent is hereby corrected as shown below:

Column 3, line 12, change "$\gamma_0$" to --$\lambda_0$--;

line 17, change "$\gamma_0$" to --$\lambda_0$--;

line 26, change "$\gamma_x$" to --$\lambda_x$--;

line 31, change "$\gamma_0$" to --$\lambda_0$--;

line 33, change "$\gamma_0$" to --$\lambda_0$--;

line 39, change "$65_x$" to --$\lambda_x$--;

change "$\gamma_x$" to --$\lambda_x$--.

Signed and Sealed this

Seventh Day of July, 1998

Attest:

BRUCE LEHMAN

Attesting Officer

Commissioner of Patents and Trademarks